United States Patent
Bateman et al.

[11] Patent Number: 6,043,756
[45] Date of Patent: Mar. 28, 2000

[54] AIRCRAFT WEATHER INFORMATION SYSTEM

[75] Inventors: Charles D. Bateman, Bellevue; John Hruby, Monroe; Kevin J. Conner, Kent, all of Wash.

[73] Assignee: AlliedSignal Inc., Morristown, N.J.

[21] Appl. No.: 09/248,367

[22] Filed: Feb. 8, 1999

Related U.S. Application Data

[60] Provisional application No. 60/074,067, Feb. 9, 1998.

[51] Int. Cl.$^7$ .................................................. G08B 23/00
[52] U.S. Cl. ...................... 340/945; 340/949; 340/968; 342/26; 701/14
[58] Field of Search .................................... 340/945, 949, 340/968; 701/14; 342/26

[56] References Cited

U.S. PATENT DOCUMENTS

| | | | |
|---|---|---|---|
| 3,750,166 | 7/1973 | Dearth | 346/6 TV |
| 4,295,139 | 10/1981 | Arpino | 340/949 |
| 4,318,076 | 3/1982 | Whitfield | 340/949 |
| 4,347,618 | 8/1982 | Kavouras et al. | 375/37 |
| 4,521,857 | 6/1985 | Reynolds, III | 364/439 |
| 4,642,775 | 2/1987 | Cline et al. | 364/443 |
| 4,706,198 | 11/1987 | Thurman | 364/439 |
| 4,729,102 | 3/1988 | Miller, Jr. et al. | 364/424 |
| 5,049,886 | 9/1991 | Seitz et al. | 342/26 |
| 5,105,195 | 4/1992 | Keedy | 340/968 |
| 5,111,400 | 5/1992 | Yoder | 364/424.01 |
| 5,153,836 | 10/1992 | Fraughton et al. | 364/461 |
| 5,325,302 | 6/1994 | Izidon et al. | 364/461 |
| 5,363,107 | 11/1994 | Gertz et al. | 342/26 |
| 5,379,215 | 1/1995 | Kruhoeffer et al. | 364/420 |
| 5,383,133 | 1/1995 | Staple | 364/508 |
| 5,434,565 | 7/1995 | Simon | 340/949 |
| 5,463,656 | 10/1995 | Polivka et al. | 375/200 |
| 5,467,274 | 11/1995 | Vax | 364/424.06 |
| 5,493,309 | 2/1996 | Bjornholt | 342/455 |
| 5,657,009 | 8/1997 | Gordon | 340/968 |
| 5,677,841 | 10/1997 | Shiomi et al. | 364/439 |
| 5,714,948 | 2/1998 | Farmakis et al. | 340/961 |
| 5,740,047 | 4/1998 | Pilley et al. | 364/439 |
| 5,867,805 | 2/1999 | Brown | 702/3 |
| 5,890,079 | 3/1999 | Levine | 701/14 |

OTHER PUBLICATIONS

"Weather Report System Integrates Data, Offers 5–Min. Updates"; Michael O. Lavitt; p. 84, Aviation Week & Space Technology, Aug. 9, 1999.

*Primary Examiner*—Edward Lefkowitz

[57] ABSTRACT

A system and method for downlinking weather data, generated by existing weather and data sensors, to a ground station. The ground station utilizes data from multiple aircraft to form refined weather information, and uplinks the refined weather information to the aircraft. The refined weather information is stored at the aircraft and picture generating equipment, such as an existing onboard ground proximity terrain picture and symbol generator, generates pictorial information depicting weather. The pictorial information is displayed, for example by an existing EFIS or weather radar display, in the form of polygons.

6 Claims, 5 Drawing Sheets

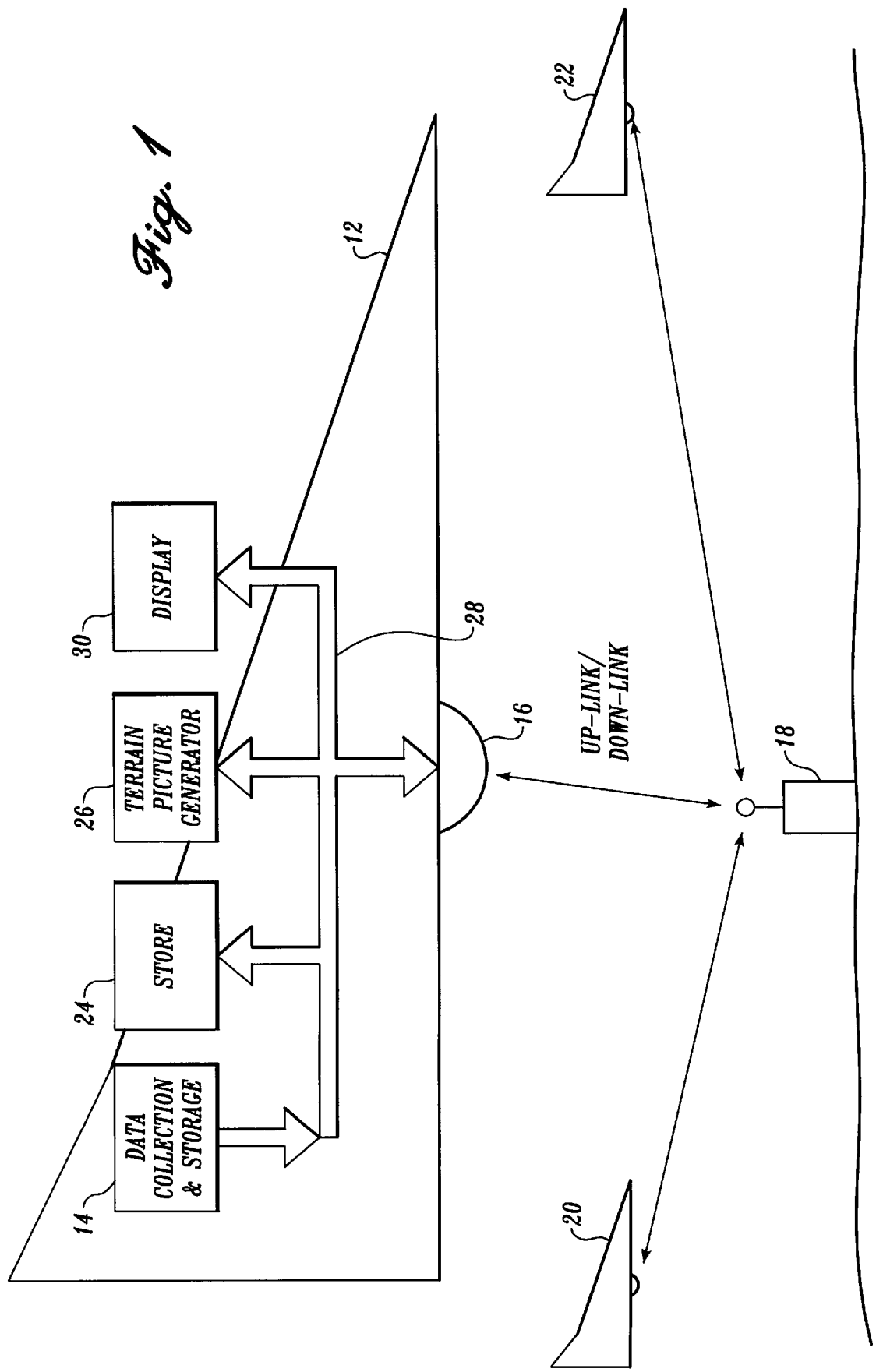

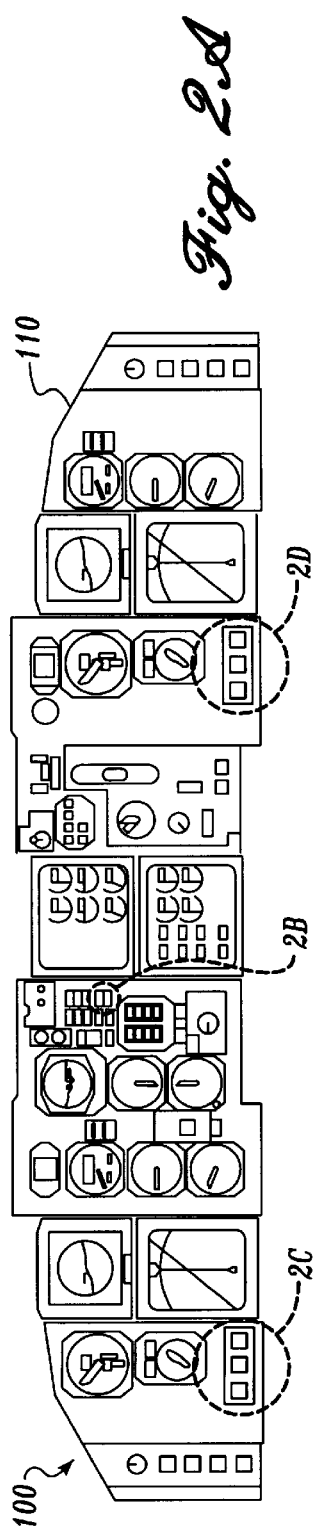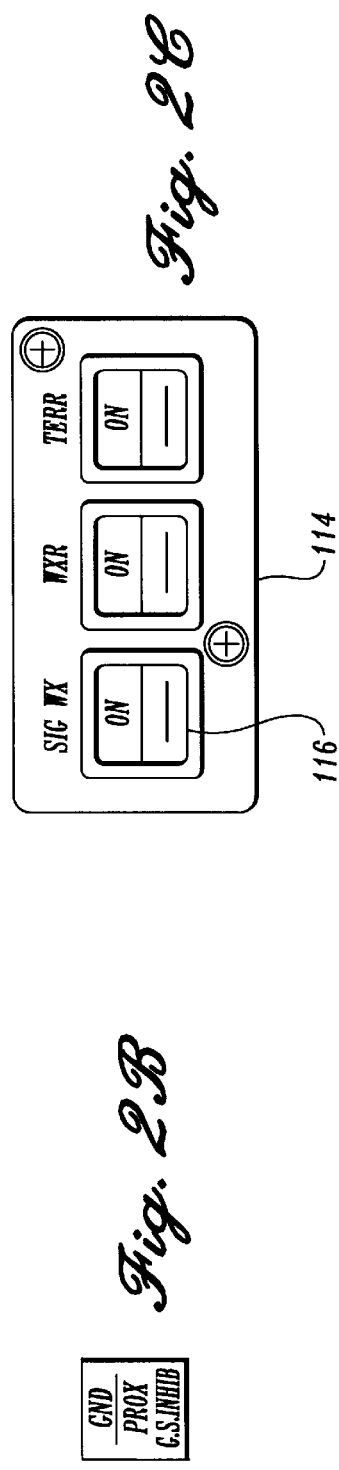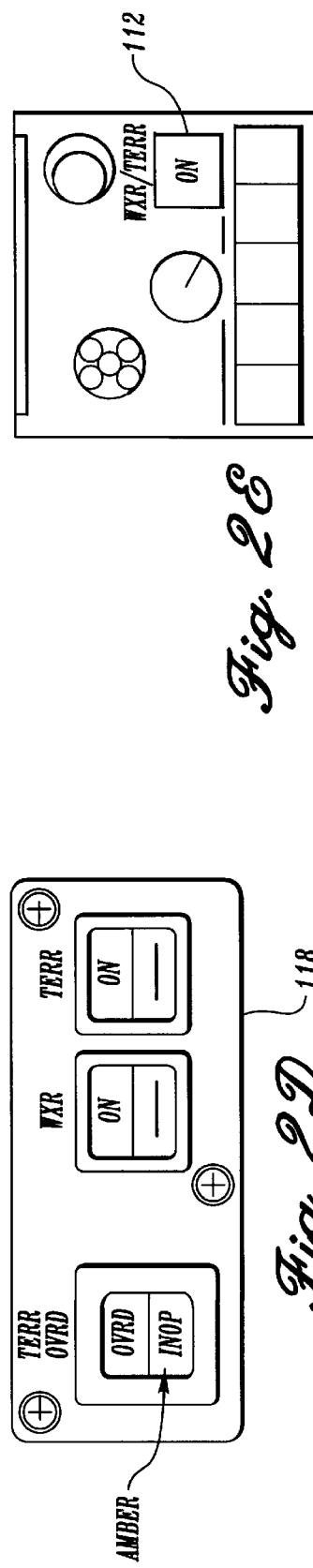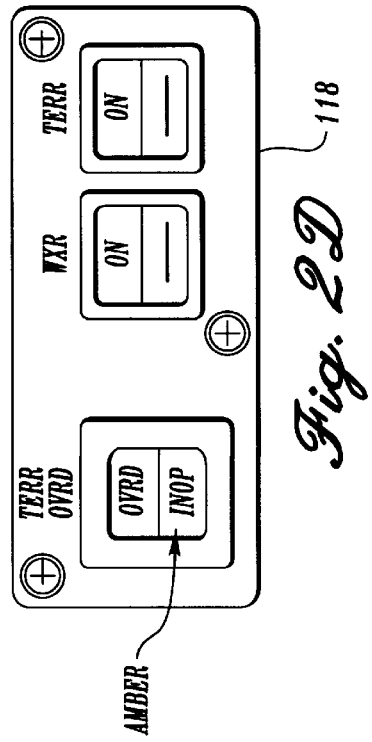

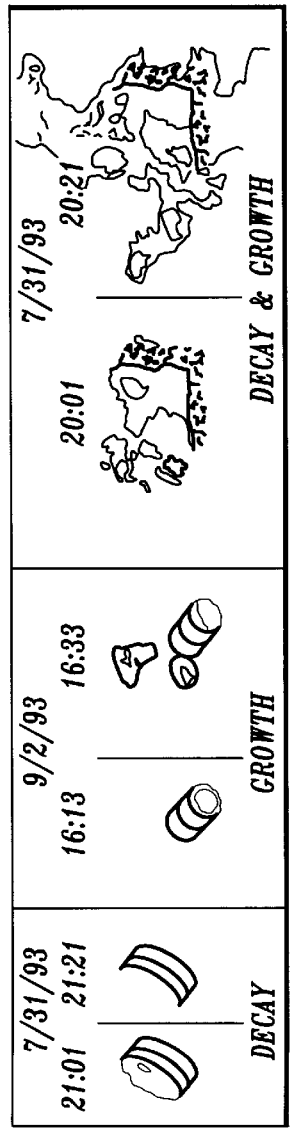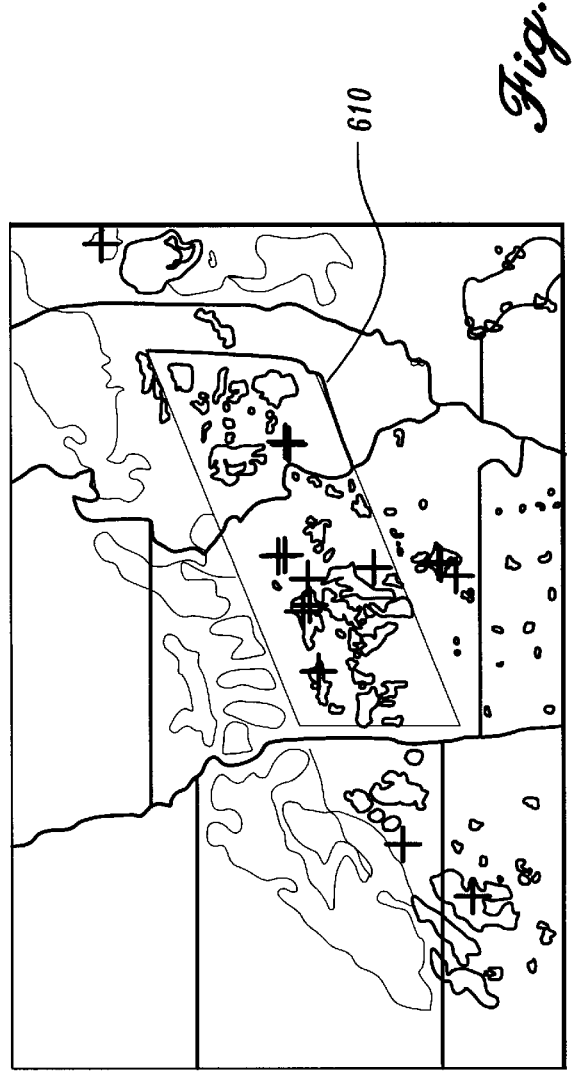

AIRCRAFT WEATHER INFORMATION SYSTEM

PRIORITY APPLICATION

This application claims benefit of provisional application Serial No. 60/074,067 filed Feb. 9, 1998, title "Aircraft Weather Information System."

BACKGROUND OF THE INVENTION

The invention relates to delivery of weather product information to the cockpit of an aircraft and in particular to providing weather data on an aircraft cockpit display.

Commercial aircraft operating in United States air space have on-board weather radar systems. Existing on-board weather radar systems provide data on weather local to the aircraft, for example, weather ahead of the aircraft within the range of the weather radar unit. The weather information is displayed on a cockpit weather display. However, the weather data collected by an aircraft is available only to the particular aircraft experiencing the weather, the data is not transferable to the ground or to other aircraft. Thus, today, weather information displayed on on-board cockpit displays is limited to the weather returns supplied by the on-board weather radar.

Visual depictions and bounding of significant hazardous weather areas outside the range of an on-board weather radar system on a cockpit display would be a significant operational tool for the aircraft crew.

SUMMARY OF THE INVENTION

The present invention resolves significant problems of the prior art by providing an aircraft weather information system wherein weather information is provided to the aircraft from various sources external to the aircraft.

According to one aspect of the invention, data generated by existing, on board sensors is downlinked to a central ground station. Similarly, existing picture generating and display equipment to used to process and display uplinked data. Accordingly, the invention can be utilized without extensive modification to standard equipment already installed on the aircraft.

According to one aspect of the invention, weather data assembled on the ground is up-linked to an aircraft for display on a cockpit display device, for example, a weather radar display or an electronic flight information system (EFIS) display.

According to another aspect of the invention, local atmospheric data collected by aircraft weather radar systems and other aircraft sensors, including actual aircraft accelerations and other flight data; altitude; and position are down-linked to a ground station. The down-linked data is assembled with other weather information and an up-to-date atmospheric model is developed. Weather products based on the up-to-date atmospheric model are up-linked to aircraft and displayed in the cockpit. According to yet another aspect of the invention, the up-linked weather products are displayed upon command depicted as bounded polygons on the cockpit display.

Other advantages and features of the invention will be apparent in view of the following detailed description and appended drawings.

BRIEF DESCRIPTION OF THE DRAWINGS

FIG. 1 illustrates a practical application according to one embodiment of the present invention;

FIGS. 2A–2E illustrate a typical cockpit installation according to one embodiment of the present invention;

FIG. 5 illustrates a current weather product; and

FIG. 6 illustrates another current weather product, including an example of a weather polygon according to one embodiment of the present invention.

DESCRIPTION OF THE SPECIFIC EMBODIMENTS

Figure 3:
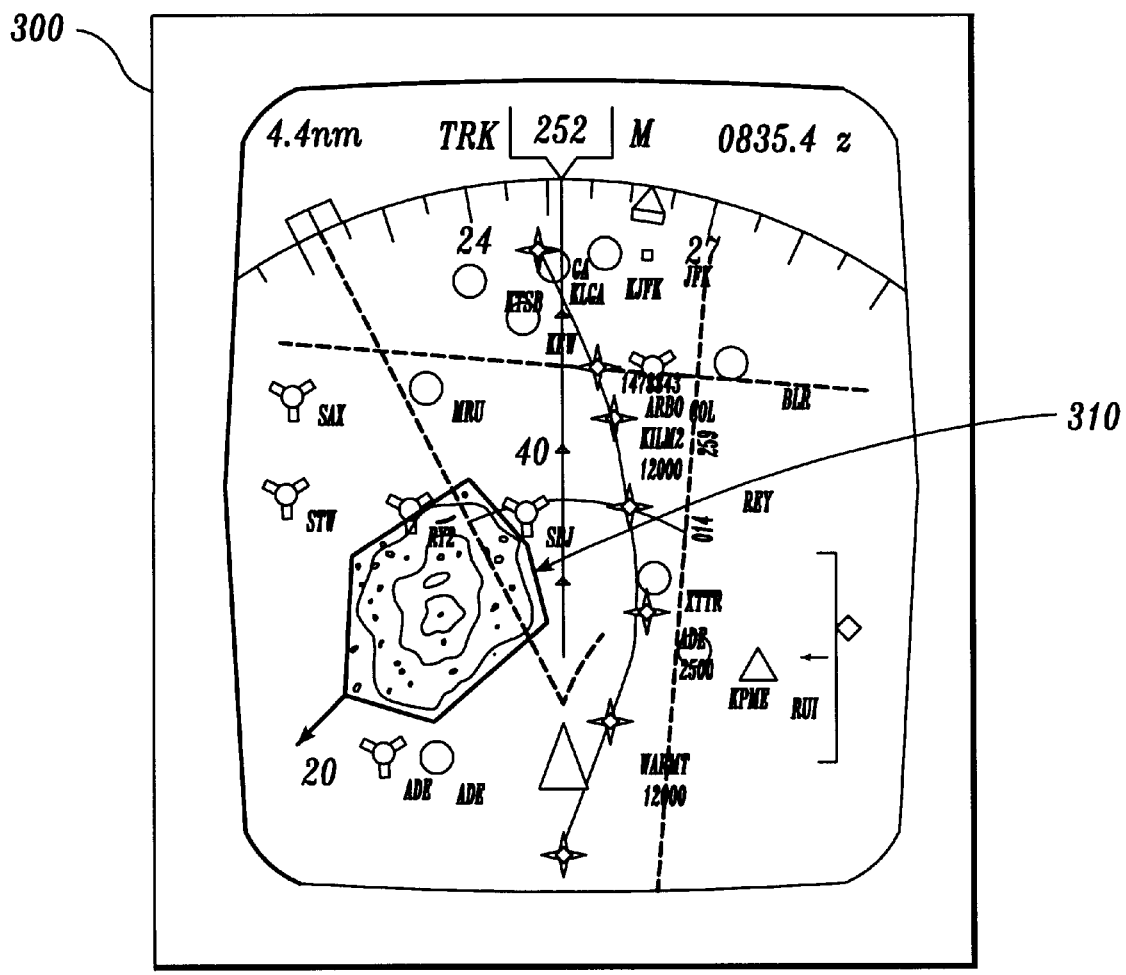
FIGS. 3 and 4 show examples of weather polygons according to one embodiment of the present invention.

In a preferred embodiment of the invention, a first aircraft collects local atmospheric data, in situ accelerations and other flight data as a function of aircraft position and altitude which is down-linked to a ground station. The down-linked information is used to assemble weather products based on, for example, National Center of Atmospheric Research models and displayed in the ground station. In a preferred embodiment of the present invention, the information is also linked to sister aircraft to increase the level of detail available for refining the weather products. According to one aspect of the invention, the invention provides multiple weather products, for example, turbulence, position, altitude, winds, temperature, severe cells from weather radar returns and other products. The ground station up-links the weather products, for example, position, speed and track, and magnitude of significant weather to the originating aircraft and other aircraft. The weather products are received, displayed and stored until the next up-link is received.

The weather products up-linked, displayed and stored by the invention include, but are not limited to, significant weather. At the pilot's discretion and for tactical use, weather areas and in particular significant hazardous weather areas are displayed on a cockpit display. The cockpit display is, for example, an existing cockpit EFIS map and/or color weather radar display found in airline service. According to one embodiment of the invention, the pilot may manually select between display of the weather products information and the display of other information such as, for example, terrain, weather radar or EFIS map.

FIG. 1 diagrams the data collection, up-link/down-link, weather product storage and display aspects of the invention. In a preferred embodiment, the invention predominantly uses existing equipment. For example, in aircraft weather information system 10 shown in FIG. 1, an aircraft 12 collects current local atmospheric data, in situ accelerations and other flight data as a function of aircraft position and altitude using existing on-board data sources, for example, on-board navigation data, altitude data, atmospheric data and weather radar return data. The invention stores the data in a memory storage location 14. The data is down-linked via an antenna 16 to a ground station 18 where the data is used to assemble and refine weather products. The weather products are up-linked to originating aircraft 12 and other aircraft 20, 22. The weather products are received and stored in a memory location 24 and converted to visual depictions using a picture generator 26, for example, an existing ground proximity terrain picture and symbol generator. The video data is transmitted via the existing weather video bus interface 28 and displayed on one or more existing cockpit color display devices 30, for example, an EFIS map and/or a weather radar display. Thus, the invention operates independently of the aircraft system level data bus and symbol generators.

In a preferred embodiment of the invention, unique polygon-shaped icon images depicting and bounding significant hazardous weather are shown on existing color displays found in the cockpit. Each unique polygon image uniquely depicts a specific significant weather hazard area, for example, convective hazard areas, potential turbulence areas, winter precipitation areas or icing areas. According to one embodiment of the invention, significant weather is displayed to a minimum range of 320 nautical miles along the aircraft's flight path. According to another embodiment of the invention, significant weather is displayed to a minimum range of 640 nautical miles along the aircraft's flight path.

FIGS. 2A–2E illustrate a typical cockpit installation 100 of the present invention. The particular cockpit installation depicted in FIG. 2 is a retrofit installation wherein an aircraft instrument panel 110 includes a ground proximity warning system accessed by weather radar/terrain switch 112. The pilot's ground proximity warning system switch panel 114 is modified to incorporate a on/off switch 116 whereby the pilot accesses the significant weather data upon command. Instrument panel 110 includes ground proximity warning system switch panel 118.

Weather radar video data bus 28 is, for example, a video data bus compliant with Aeronautical Radio, Incorporated (ARINC) standard 453, which incorporates a limited palette of colors and has limited band width capabilities. Fabrication of the unique polygon-shaped icons which depict and bound significant hazardous weather areas is bounded by these video data bus limitations. Implementation of the invention using other video data buses is possible, however, and the invention itself is not so limited.

The icons displayed are a variety of polygons unique to a specific significant weather hazard, for example, convective hazard areas, potential turbulence areas, winter precipitation areas or icing areas. According to one embodiment of the invention, the icons are two-dimensional (2D) images indicating the weather hazard's geographic location relative to the aircraft. According to another embodiment of the invention, the icons are three-dimensional (3D) images indicating the weather hazard's altitude relation to the aircraft in addition to the weather hazard's relative geographic location.

Figure 4:
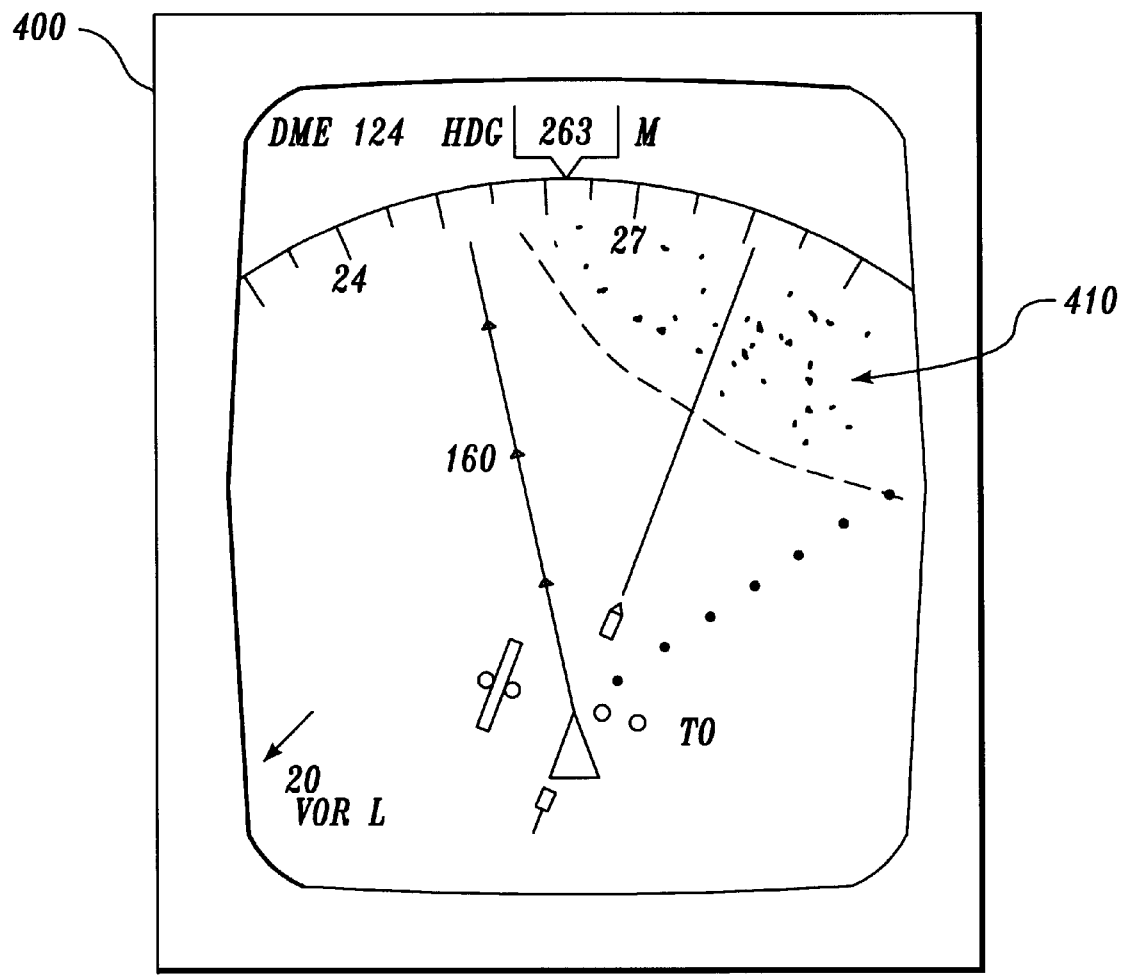

FIGS. 3 and 4 show examples of weather polygons according to the invention. FIG. 3 illustrates a cockpit display 300 selected to display data within an eighty nautical mile range of the aircraft. FIG. 3 includes an example of a unique 2D polygon-shaped image 310 depicting a predicted hazardous convectivity activity area. According to the invention, polygon-shaped image 310 is displayed in color, for example, polygon-shaped image 310 is displayed as a red polygon shape with red color dots. According to one preferred embodiment, the weather radar returns of cells lying within the hazardous convectivity activity area are displayed inside polygon-shaped image 310.

FIG. 4 illustrates another cockpit display 400 according to one embodiment of the invention selected to display data within a three hundred twenty nautical mile range. FIG. 4 includes an example of a unique 2D polygon-shaped image 410 depicting a predicted turbulence area. According to the invention, polygon-shaped image 410 is displayed in color, for example, polygon-shaped image 410 is displayed as a yellow polygon shape with yellow color dots.

FIGS. 5 and 6 illustrate two current weather products which are incorporated into the invention. FIG. 5 illustrates a storm extrapolated position (SEP) 500 indicating the growth and decay of a weather area. FIG. 6 illustrates a convective SIGMET 600 which is a weather advisory concerning weather significant to the safety of all aircraft. For example, convective SIGMETs are issued for tornadoes, lines of thunderstorms, embedded thunderstorms of any intensity level, areas of certain thunderstorms and hail ¾ inch or greater. FIG. 6 includes another example of a unique 2D polygon-shaped image 610 depicting a convective SIGMET. According to the invention, polygon-shaped image 610 is displayed in color, for example, polygon-shaped image 610 is displayed as a red polygon shape with red color dots.

What is claimed is:

1. A weather information display system comprising:
   a weather information assembling ground station including:
   reception equipment for receiving weather parameters downlinked from a plurality of aircraft based weather information systems,
   processing equipment for generating refined weather information, based on received weather parameters, using algorithms and modeling, and
   transmission equipment for uplinking refined weather information to designated aircraft; and
   an aircraft based weather information reception and display system situated on a first aircraft including:
   standard weather information gathering equipment for detecting weather parameters characterizing weather conditions in the vicinity of the first aircraft;
   transmission equipment for downlinking weather parameter to said ground station;
   reception equipment for receiving refined weather information uplinked by said ground station;
   storage equipment for storing received refined weather information;
   picture generating equipment for generating symbolic pictorial information based on the received refined weather information; and
   standard on-board weather information display equipment, coupled to the picture generating equipment, for displaying pictorial polygons indicating the location of dangerous weather conditions.

2. The system of claim 1 wherein said picture generating equipment is ground proximity terrain picture and symbol generator already installed on the aircraft.

3. The system of claim 1 wherein said display equipment is an EFIS display already installed on the aircraft.

4. The system of claim 1 wherein said display equipment is a weather radar display already installed on the aircraft.

5. A method for detecting and reporting weather conditions, said method performed by a plurality of aircraft and a ground station, said method comprising the steps of:
   at each aircraft:
   utilizing existing on-board equipment to detect weather parameters characterizing weather conditions in the vicinity of the second aircraft; and
   downlinking weather data, with downloaded weather data including weather parameters detected at each aircraft;
   at the ground station:
   receiving weather data from said plurality of aircraft;
   generating refined weather information, based on received weather data, using algorithms and modeling; and
   uplinking refined weather information to said aircraft; and
   at each aircraft:
   receiving refined weather information uplinked by said ground station;

storing received weather information;

generating symbolic pictorial information based on the received weather information utilizing standard picture generating equipment already installed on the aircraft; and displaying pictorial symbols indicating the location of dangerous weather conditions using EFIS or weather radar display equipment already installed on the aircraft.

6. The method of claim 5 where said step of displaying comprises:

displaying the area surrounding the aircraft's flight path; and displaying polygons representing significant weather formations, based on said uplinked weather information, relative to said flight path so that a pilot may navigate away from dangerous weather.

* * * * *